Dec. 28, 1965  J. B. WILEY  3,225,424
METHOD OF MAKING AN EDGE WOUND CORE
Filed July 29, 1964  9 Sheets-Sheet 1

INVENTOR.
John B. Wiley
BY
Albert H. Reuther
His Attorney

Dec. 28, 1965   J. B. WILEY   3,225,424
METHOD OF MAKING AN EDGE WOUND CORE
Filed July 29, 1964   9 Sheets-Sheet 2

INVENTOR.
John B. Wiley
BY
His Attorney

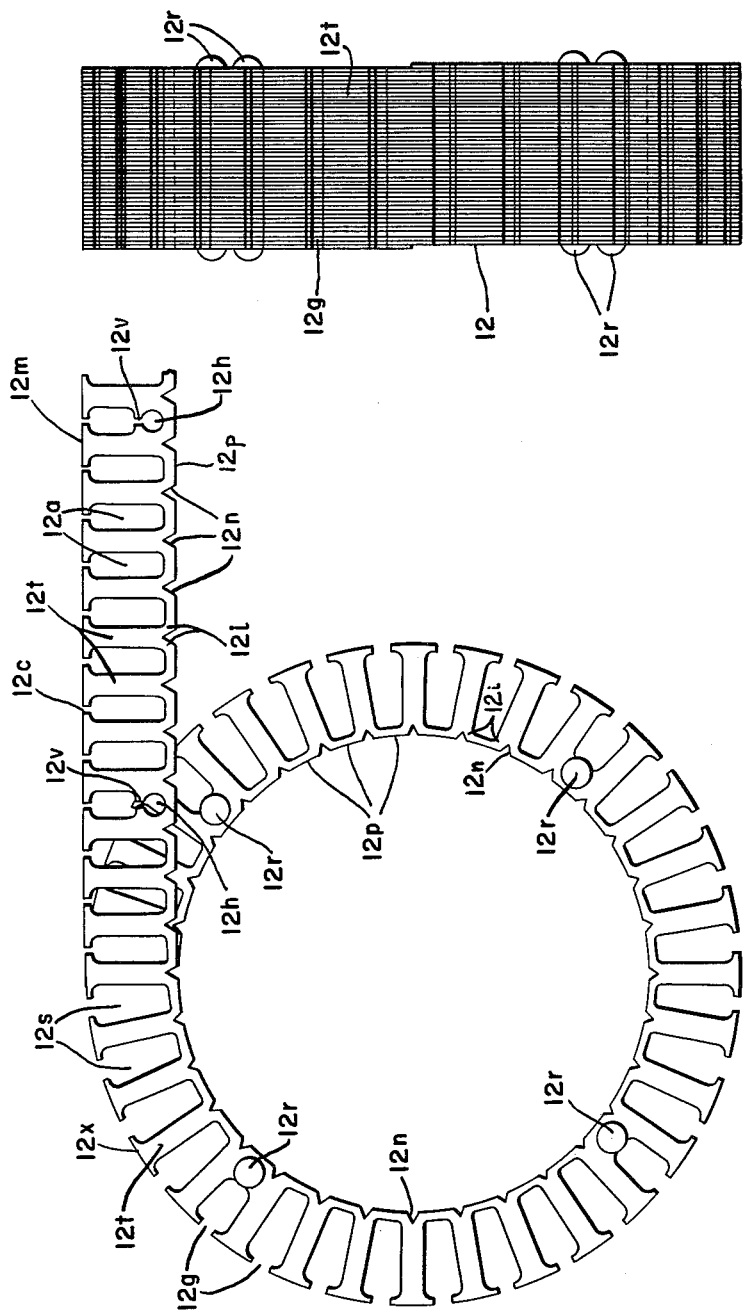

INVENTOR.
John B. Wiley

Dec. 28, 1965  J. B. WILEY  3,225,424
METHOD OF MAKING AN EDGE WOUND CORE
Filed July 29, 1964  9 Sheets-Sheet 5

INVENTOR.
John B. Wiley
BY
His Attorney

Dec. 28, 1965 J. B. WILEY 3,225,424
METHOD OF MAKING AN EDGE WOUND CORE
Filed July 29, 1964 9 Sheets-Sheet 6
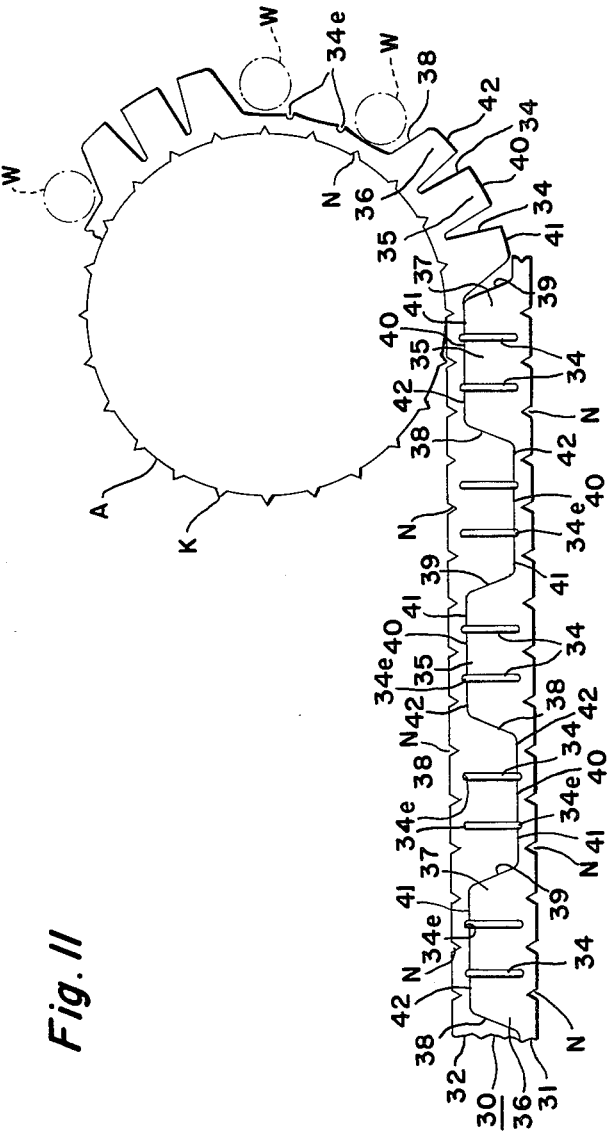
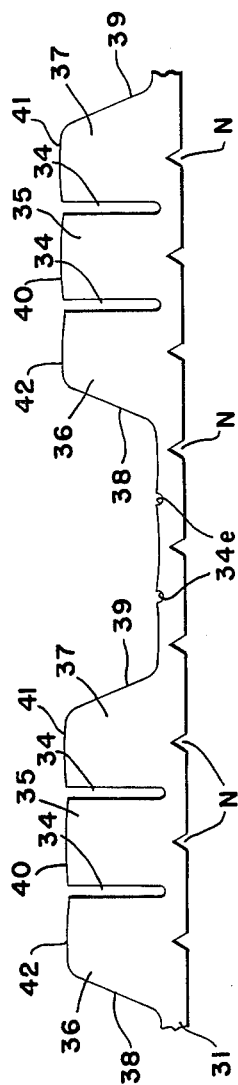
INVENTOR.
John B. Wiley
BY
His Attorney Dec. 28, 1965     J. B. WILEY     3,225,424
METHOD OF MAKING AN EDGE WOUND CORE Filed July 29, 1964     9 Sheets-Sheet 7

INVENTOR.
John B. Wiley
BY
Albert H. Reuther
His Attorney

Dec. 28, 1965 J. B. WILEY 3,225,424
METHOD OF MAKING AN EDGE WOUND CORE
Filed July 29, 1964 9 Sheets-Sheet 9

INVENTOR.
John B. Wiley
BY
His Attorney

United States Patent Office 3,225,424
Patented Dec. 28, 1965

3,225,424
METHOD OF MAKING AN EDGE WOUND CORE
John B. Wiley, London, Ontario, Canada, assignor to General Motors Corporation, Detroit, Mich., a corporation of Delaware
Filed July 29, 1964, Ser. No. 385,940
4 Claims. (Cl. 29—155.57)

This invention relates to dynamoelectric machine means, and, more particularly, to layered formation of components thereof. This is a continuation-in-part of my copending U.S. patent application S.N. 70,262 filed November 18, 1960, now Patent 3,188,505, issued June 8, 1965.

An object of this invention is to provide a new and improved structural arrangement for stator and rotor components of dynamoelectric machines. A saving in laminating material is realized. Also their is standardization of laminating material. The same laminating material is useful both for inside-out arrangement of stator as well as rotor components and vice versa in outer stator with central rotor arrangement thereof.

Another object of this invention is to provide dynamoelectric machine stator and rotor lamination structures each involving a laterally slotted longitudinal strip. This strip is notched in locations intermediate to the slots. The slots become substantially longitudinally aligned to each other in predetermined numbers upon assembly of notched strip onto an annular member as a mounting therewith, the slots having winding means therein.

Another object of this invention is to provide dynamoelectric machine stator and rotor lamination structures each including an annular support as well as slotted lamination means press-fitted thereto. The lamination means have a body portion arcuate in configuration as bent from a continuous strip. The strip has a plurality of slots initially small in area to save waste of material. The slots are then enlarged as to open area when teeth therebetween are caused to spread from each other adjacent to free radially outer ends thereof. There are notches along radially inner edging in alignment with slots and intermediate the teeth. Such notches facilitate bending and simultaneously provide a reluctance air gap free of open slots from which windings can dislocate. An identical strip material can be used both for stator as well as rotor structures. The windings tend to push into depth of the slots rather than out of any inner opening of the laminated configuration.

A further object of this invention is to provide a dynamoelectric machine component such as a rotor for an inside-out motor as well as an external stator for a central rotor arrangement of a motor. The component includes dual spiral portions one of which is an outer solid arcuately bent strip to form a metal core concentrically outside an inner slotted portion bent to fit tightly though replaceable for servicing inside the core. The inner slotted portion has windings in slots of enlarged area between teeth. The teeth originally were close together though subsequently the teeth are radially spread during increase of initial small slot area to larger slot area. This subsequent slot area increase leaves substantially twenty percent less scrap. Also slot openings are closed off by the outer spiral core. This assures retention of windings between inner and outer spiral portions. The windings cannot become dislocated from the slots by any movement radially inwardly since the slots are closed off along a radially inner periphery of the strip formed into the inner portion.

Another object of this invention is to provide a dynamoelectric machine component such as a rotor to be centrally located on a motor as well as a stator for an inside-out motor. The component includes an annular support or continuous central portion resembling a pulley or rim of a wheel over the outer periphery of which a slotted spiral portion is press-fitted and carries winding means. The slotted spiral portion defines slots having optional skew though upon spiral positioning thereof the winding means holds slotted strip material together. The continuous support or central portion can have the outer periphery thereof rough and free of machining and finishing.

Another object of this invention is to provide improved dynamoelectric machine means article formation by use of spiral metal strip means including plural teeth joined to each other only along edging of one side thereof. The strip means is subject to notching of this edging in locations radially aligned with the teeth. Adjacent to these locations hinging can occur during bending at metal segments having a width less than full width of teeth due to provision of the notching. This notching finally facilitates spiral positioning of the slotted strip means during sprocket-teeth arbor engagement thereof. The notching also effects arcuate distance aligning by stretching or elongating of metal at every tooth location during spiral formation of enlarged slotted stator and rotor laminating components.

A further object of this invention is to provide dynamoelectric machine stator and rotor component formation by a procedure including use of a continuous longitudinally extending metal strip having plural teeth joined to each other only along edging of one side thereof subject ot notching of this edging in locations radially aligned with the teeth. Adjacent to these locations during strip bending, an action of hinging occurs at reduced width segments due to provision of the notching. Such notching provides location for tooth to tooth spacing of engagement of the metal strip edging during spiralling or edge-winding thereof peripherally over an annular arbor having spline keying thereon for exact positioning and stretching. Arbor engagement with the strip of the metal strip at every notching location assures precision in spiral component formation slotted due to arcuate spiral tooth alignment for winding insertion.

Another object of this invention is to provide dynamoelectric machine stator and rotor component formation by a procedure including use of a continuous longitudinally extending metal strip having predetermined teeth joined by continuous edging only along one side thereof subject to notching of this edge in locations radially aligned with the teeth. Adjacent to these locations hinging occurs at reduced width segments due to provision of the notching. The metal strip has such notching along opposite edging and predetermined cutting centrally transverse and arcuate within the longitudinally extending strip for forming a pair of identically toothed strips. Each of the strips is ultimately formed into an annular and externally rounded configuration free of need for machining of either thereof. Also each is individually formed into an annular configuration by arbor keying engagement with the notching for savings of material, labor and equipment expenditure.

Another object of this invention is to provide for assembly of an alternator means on which a thick and heavy frame is eliminated by use of a "tin-can" housing. The alternative means has an externally mounted edge-wound spiral yoke of metal radially aligned on an annular thin metal body portion of the "tin-can" housing. This thin metal body portion fits along the inner periphery of the edge-wound spiral yoke. The thin metal body portion is complementary also to an internally secured edge-wound spiral stator means slotted to receive coil assembly therewith radially between the external yoke and a central rotor means. This rotor means is suitably journaled by end portions sealingly secured to ends of the anular thin sheet metal body portion.

Further objects and advantages of the present invention will be apparent from the following description, reference being had to the accompanying drawings wherein preferred embodiments of the present invention are clearly shown.

In the drawings:

FIGURES 4 and 5 are elevational and end views respectively of another portion of the same component.

FIGURE 10 is a view showing further changing of metal strip means having notching and cutting features for keyed-arbor spiral formation of dynamoelectric machine components to be fitted with winding means in expanded or slot locations.

FIGURE 11 is an enlarged fragmentary view of one portion of the metal strip means of FIGURE 10.

Figure 1:
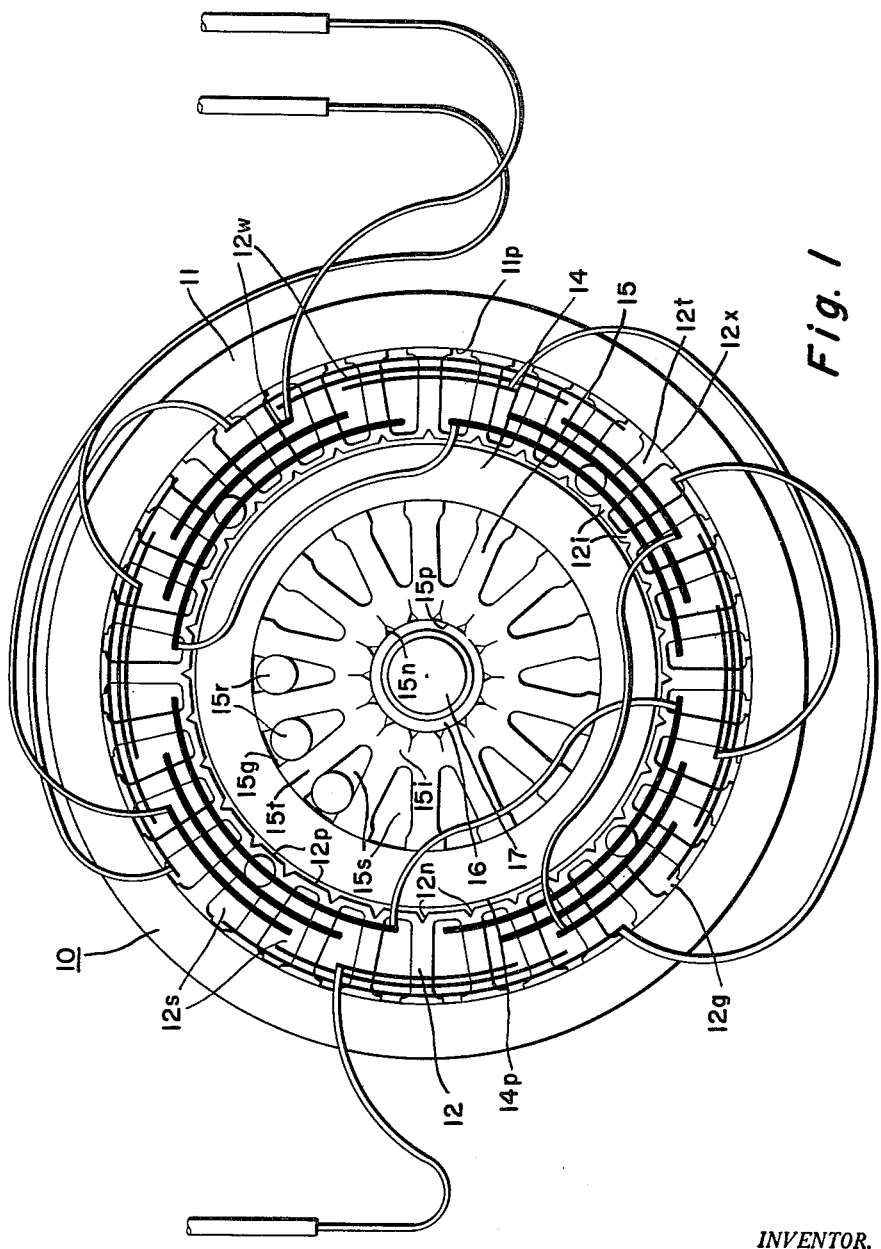
FIGURE 1 is an elevational view of dynamoelectric machine components in accordance with the present invention.

FIGURE 1 illustrates a dynamoelectric machine generally indicated by numeral 10 including stator and rotor components adapted to be mounted inside a housing (not shown). Structural arrangement of these components is such that each thereof can be used equally well both for inside-out as well as for central rotor arrangement of motors or generators for example. In the dynamoelectric machine 10 there is an outer annular component having both a core portion 11 as well as a slotted strip portion 12 assembled thereto in accordance with the present invention. The dynamoelectric machine 10 further includes an inner component having a radially outer metal band portion 14 surrounding a radially inner strip portion 15 carried by a solid sleeve or cylindrical bearing member 16 journaled on a shaft 17.

Figure 3:
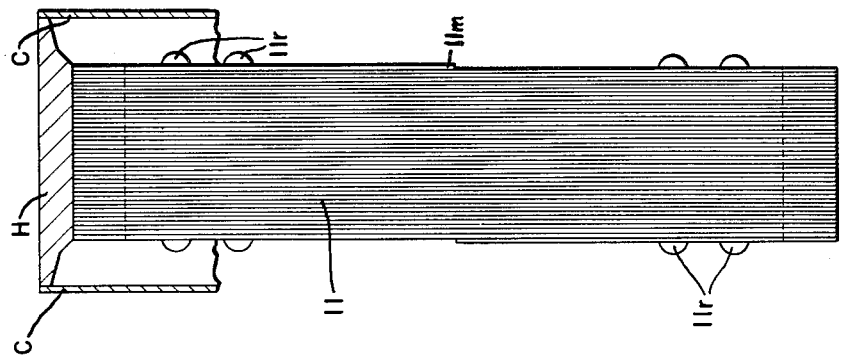
FIGURES 2 and 3 are elevational and end views respectively of one portion of one of the components in FIGURE 1.
Figure 2:
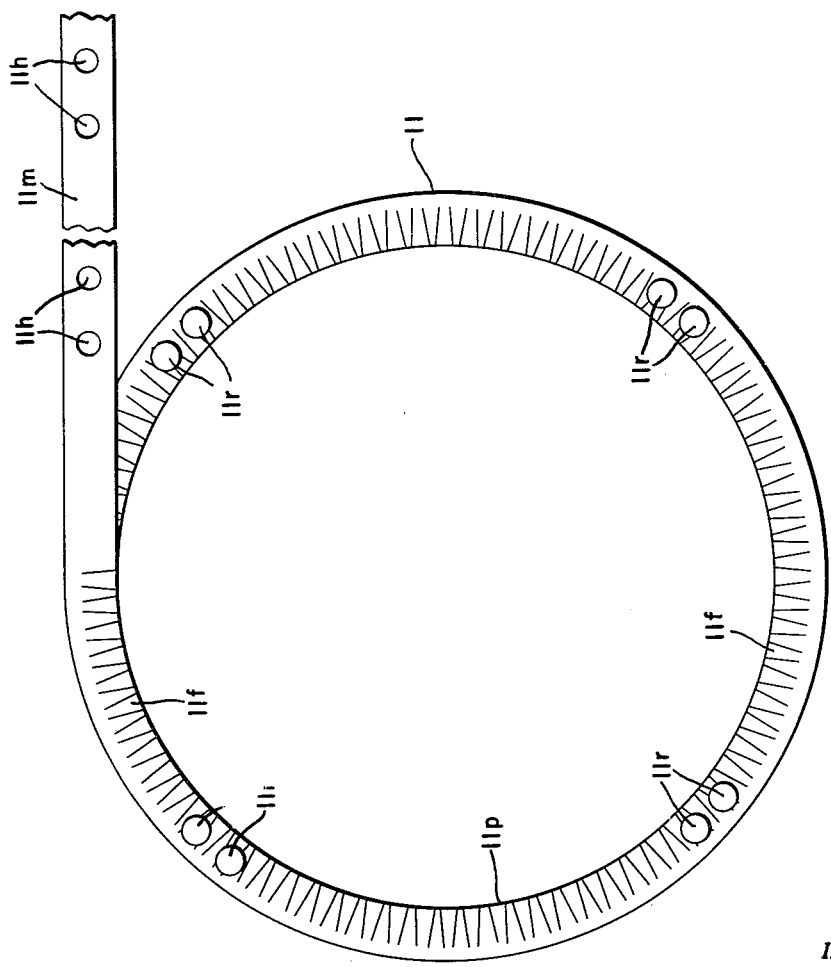

FIGURES 2 and 3 illustrate the core portion 11 in further detail. This core portion 11 is formed from a straight continuous strip of sheet metal indicated by reference numeral 11m. There are predetermined holes 11h punched therethrough at predetermined intervals such that the metal strip 11m can be bent into a generally spiral and arcuate configuration including a plurality of flutes 11f. The flutes 11f extend generally radially for at least one half the width of the metal strip and become nested progressively as the strip material 11m is continuously bent into a predetermined stack-up illustrated by FIGURE 3. Suitable fastening means such as rivets 11r can be inserted through holes such as 11h and serve to hold the core portion 11 in an arcuate subassembly of the outer component of the dynamoelectric machine 10 in accordance with the present invention. A cast housing portion H including a pair of covers C carried by opposite ends thereof can be provided for mounting of the core portion 11 and dynamoelectric machine components in accordance with the present invention. It is to be understood that the end covers C can be provided with central hubs for journaling opposite ends of shaft 17 on which the inner member of component including portions 14 and 15 can be mounted. As illustrated in FIGURE 3, the core portion 11 can be press-fitted to the housing portion H so as to be retained concentrically therein.

In accordance with the present invention, the slotted strip portion 12 is further made of arcuately bent strip material prepunched in predetermined longitudinal sequence to define a plurality of metal teeth 12t each located between a pair of laterally open apertures 12a. Each of the teeth 12t has a notch 12n formed substantially in lateral alignment therewith in locations intermediate pairs of apertures 12a. Periodically an aperture such as 12a is made to have slightly less width or depth so as to permit formation of holes such as 12h through which rivets 12r can be secured. The rivets 12r are for fastening the slotted portion 12 into an arcuate subassembly adapted to be press-fitted into engagement with a radially inner periphery 11p of the core portion 11. The apertures 12a, the notches 12n and holes 12h are punched into a continuous longitudinally extending metal band 12m of relatively ductile material, such that, the silicon steel band is made readily bendable by provision of the notches 12n which are in alignment with ease of the teeth 12t. It is to be understood that strip material of the band 12m between the notches 12n forms a radially inner periphery 12p composed of a plurality of segments or sections designated collectively by reference numerals 12p. Each of these peripheral segments 12p is joined at opposite ends by an intermediate segment 12i that serves as a bendable hinge such that the apertures 12a as originally punched can have a smaller area than slots 12s. The slots 12s are larger in area due to angular separation of transversely extending ends 12x of each of the teeth 12t. Initial end cuts 12c adjacent to one side of each of the apertures 12a can expand into relatively larger gaps 12g through which winding means 12w shown in FIGURE 1 can be inserted. These winding means 12w can include a plurality of concentric coils fitted into predetermined locations in the slots 12s. It is emphasized that the gaps 12g become closed over when the slotted portion 12 is press-fitted peripherally inside the core portion 11. It is to be noted further that the slotted portion 12 together with the winding means 12w carried thereby can be readily replaced for servicing by separation of the dual annular portions 11 and 12 of the radially outer component of the dynamoelectric machine 10. Due to the fact that the apertures 12a have a smaller area than the slots 12s which result from arcuate bending of the strip material, there is appreciably less scrap. In some instances there can be up to twenty percent less scrap metal than would be encountered if the slots were formed by a more conventional lamination structure. Furthermore by having the gaps 12g along a radially outer location of the slotted portion 12 there is a further saving in material than would result by having the gaps in a radially inner position. When the gaps are in a radially inner position there are several disadvantages including the matter of additional scrap material. The reason for additional scrap material and waste encountered by having the gaps in a radially inner position even when bending a longitudinal metal strip into an arcuate spiral is that apertures such as 12a and cuts 12c must be made initially larger to permit arcuate bending of the strip material so as to make the slots such as 12s smaller. Such smaller slots are undersirable not only from the material standpoint but also so far as efficient placement and spacing of winding means is concerned. Furthermore, when the gaps such as 12g are along a radially inner periphery there can be no radially inner closure of the slots as provided by the peripheral segments 12p collectively in accordance with the present invention. Once the strip material is bent into an arcuate subassembly and then joined by rivets 12r, the notches 12n have a substantially V-shape less in width but retaining substantially the same depth laterally into each of the teeth 12t. This serves to increase reluctance in notch locations due to increase of air gaps in alignment with the notches relative to the inner component. These air gaps in alignment with the notches 12n are greater than the air gap between peripheral segments 12p relative to an outer periphery of the inner component. To assure even arcuate bending of the strip material 12m throughout the length thereof including locations where the holes 12h for the rivets are located, there is provided a lateral slit or void 12v as shown in FIGURE 4. Each slit or void 12v can permit the cuts 12c to be expanded uniformly into larger gaps 12g as indicated earlier.

Figure 7:
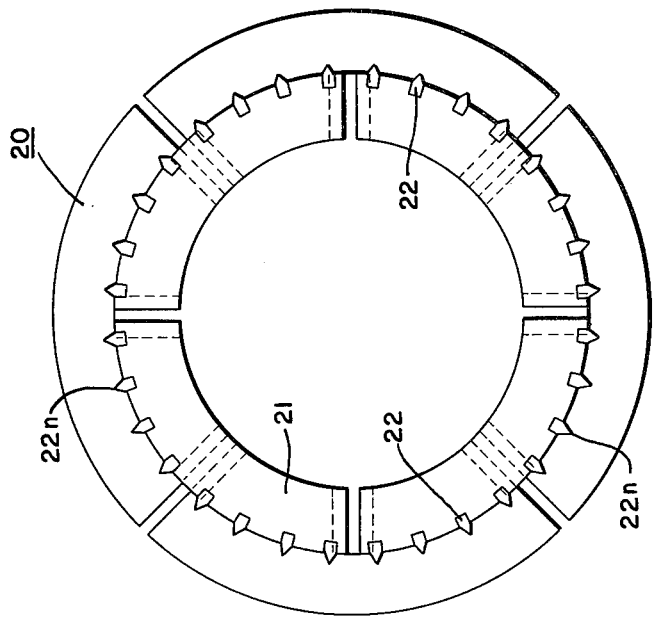
FIGURES 6 and 7 are elevational and end views respectively of an arbor used during formation of the portion of FIGURES 4 and 5.
Figure 6:
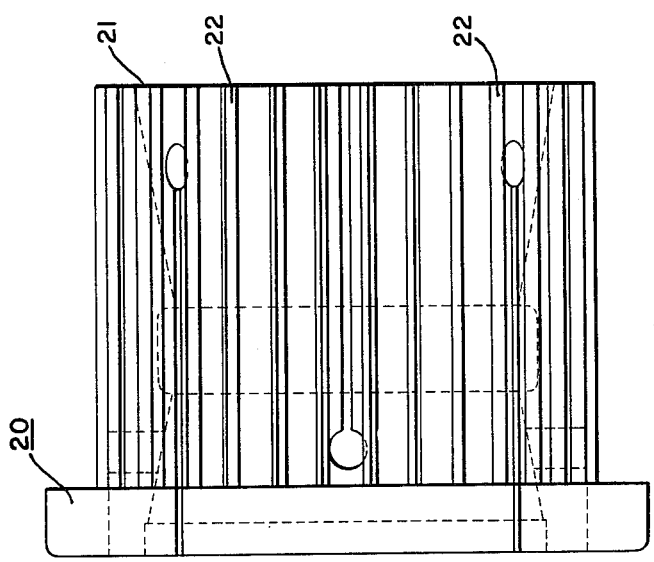

FIGURES 6 and 7 illustrate an arbor generally indicated by numeral 20 including a substantially cylindrical body portion 21 having a plurality of splines or keys 22 secured to an outer periphery thereof. These splines or keys have pointed ends 22n best seen in FIGURE 7 and adapted to complement the notches 12n of the metal band 12m. The arbor or tool 20 can be mounted on a lathe-like means to effect turning and spiral bending or edge-winding of the slotted portion 12 so as to have slots such as 12s substantially in longitudinal alignment with each other. However it is to be understood that the slots 12s can also be formed to have a skew or angular relation to a central axis of the angular portion. Various modifications in tooling can be provided for forming dynamoelectric machine components and portions thereof in accordance with the present invention. The arbor means 20 is shown merely to illustrate one way of forming one of the portions for the dynamoelectric machine 10 in accordance with the present invention. Differing diameters of cylindrical body portions, such as 21, must be provided for formation of differing portions of the components in accordance with the machine of the present invention. It is to be understood that the portions 11 and 12 of the outer component described above can be used either as a rotor for an inside-out motor or generator or as a stator for use around a central rotor journaling arrangement of a motor or generator. Further it is to be understood that the core portion can be made of a solid annular member including sintered metal pressed into an annulus to provide a magnetic path for flux surrounding the winding means 12w. The winding means 12w can also be made of cast metal, for instance, when the outer component including portions 11 and 12 is to be a rotor of an inside-out dynamoelectric machine used to power a ventilating fan for example.

Referring again to FIGURE 1, the inner component includes a core portion 14 that can be an annular metal casting, a sintered metal annulus or again a spiral banding of metal strip similar to 11m and also having flutes and fastening holes except for a smaller over-all diameter thereof. When a metal strip such as 11m is used for the inner component also it is apparent that there is a first standardization of the inner and outer components including use of only a longitudinally metal strip or band which is formed into an edge-wound core portion identical in all respects except for diameter so as to be concentrically spaceable relative to each other. It is to be noted that the flutes such as 11f when provided on the core portion 14 will also extend radially for at least one half the width of the strip material. The flutes 11f are located radially inwardly such that a substantially smooth outer periphery 11p is formed separated by a predetermined air gap from the peripheral portion 12p. The core portion 11 having flutes 11f provides a radially outwardly magnetic material surrounding the core portion 14. The core portion 14 is press-fitted over an outer periphery of the slotted strip portion 15 that has teeth 15t identical to the teeth 12t. The strip portion 15 provides slots 15s larger in area than apertures of a flat and continuous longitudinal strip of metal from which the portion 15 is formed. In the embodiment illustrated by FIGURE 1, the strip material such as 12m is identical to that used to form both the slotted portion 12 as well as the inner slotted portion 15. Since only the diameters are different in the end result, there is a further standardization of the metal materials usable for making inner and outer components for a dynamoelectric machine in accordance with the present invention. Both the metal strips 11m and 12m can be used identically for forming inner and outer components except for difference in diameter. It is to be noted that the inner strip portion 15 is provided with notches designated by numeral 15n substantially in radial alignment with teeth 15t forming the slots 15s open at gaps 15g which can be closed off by press-fit of the inner strip portion 15 along an inner periphery of the inner core portion 14. The solid bearing means or solid yoke or sleeve 16 provides a mounting relative to shaft 17. The sleeve or yoke 16 can be press-fitted along an inner periphery of the inner strip portion 15. It is to be understood that again the slots 15s can be longitudinally in alignment with each other or can be skewed as desired. Actual coil windings or electrically energizable wiring can be fitted into the slots 15s. Also a plurality of rods such as 15r can be pressed into the longitudinally aligned or skewed slots. Ends of these rods 15r can be swaged or peened over as well as joined by cast metal end rings when actual wiring or coil windings are not used for the inner strip portion 15 having the slots 15s. In the event coil windings are provided for the inner strip portion slots 15s, then suitable interconnecting leads can be provided similar to interconnecting leads outlined for the windings such as 12w in FIGURE 1. For the inner component including the core portion 14 and inner slotted portion 15 it is again apparent that the gaps 15g are closed off by the core portion 14 similar to the closing off of gaps 12g by the core portion 11. Thus the winding means in these slots 15s will be retained even against dislocation due to centrifugal forces acting radially outwardly on the windings. The slots 15s again increase in area from initial apertures such as 12a of the strip material from which the inner strip portion 15 can be formed and there is a commensurate saving of material. The notches 15n permit close-in mounting of the strip material that has intermediate hinge like segments 15i located between each of the teeth and an inner periphery 15p of the inner strip portion 15 on the yoke or sleeve 16 noted earlier. The portions 11 and 12 as well as portions 14 and 15 have a press-fitted juncture between each thereof. It is apparent that the strip portions 12 and 15 can be more easily fitted with windings because wire can be packed radially inwardly from the outer gaps 12g and 15g. This radially inward packing or fitting of wire into windings permits use of wire winding machines and facilitates automation and operation thereof. Any coils or wiring fitted into such slots as 12s and 15s tends to push itself deeper into the slots rather than out of the previously known radially inner openings or gaps of other lamination structures. Feeding of longitudinal strip material can be automated by any suitable means and preferably one notch cooperable with a spline or key such as 22 can be provided for each tooth provided between predetermined numbers of slots of inner and outer components of a dynamoelectric machine in accordance with the present invention. The separable outer annular ring means or core portions 11 and 14 can form an outer periphery of either a rotor or stator for a dynamoelectric machine.

In any event, the ends such as 12x of the teeth 12t and the like are caused to spread from each other adjacent to free radially outer ends of the teeth while notches along radially inner edging in alignment with slots and intermediate the teeth facilitate bending and simultaneously provide a reluctance air gap free of open slots from which windings can dislocate. Identical strip material for at least one of each of dual spiralled portions can be used both for stator and rotor structures.

Figure 9:
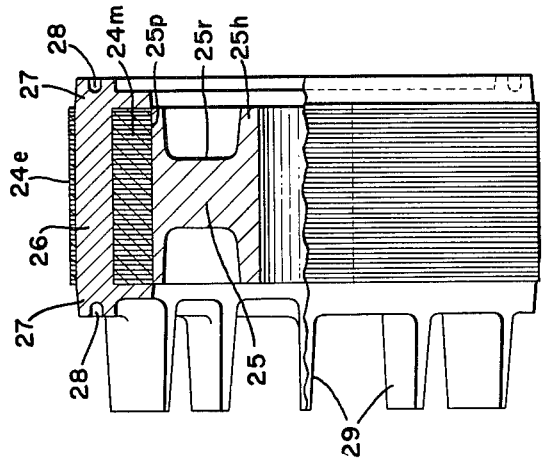
FIGURES 8 and 9 are elevational and end views respectively of an alternate form of the inner component for use in the machine of FIGURE 1.
Figure 8:
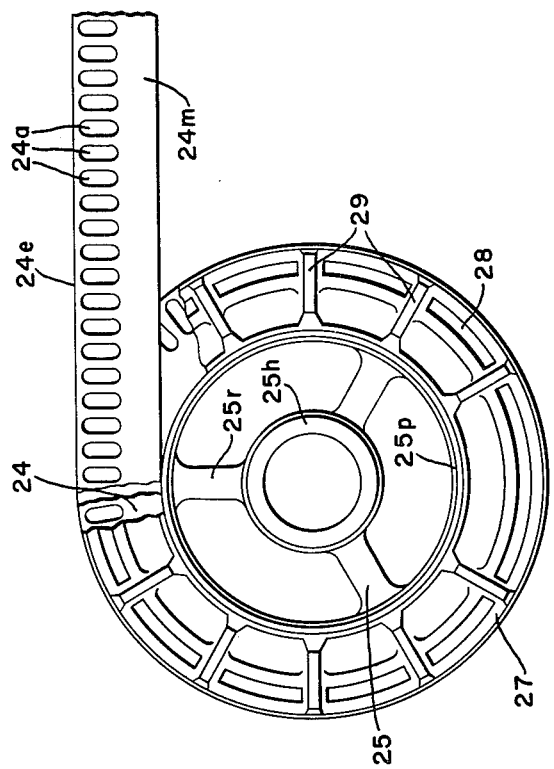

FIGURES 8 and 9 illustrate an alternative structure for the inner component to include a slotted portion 24 and a pulley-like central portion 25. The annular central portion 25 includes a hub 25h that can be journaled directly on a shaft such as 17 and radial spokes 25r join the hub 25h to an annular peripheral portion 25p over which a spiralled laminating means 24m is press-fitted in a stacked-up formed from a solid longitudinal strip of metal projecting from one side of the view of structure in FIGURE 8. In this embodiment the metal strip 24m has a plurality of elliptical slots for apertures 24a therein. Folds (not shown) similar to flutes such as 11f shown in FIGURE 2 can be formed during bending of the strip of metal into a spiral lamination portion. A continuous edge 24e can remain intact such that the apertures 24a do not become slots open along one side. Then a cast metal winding including conductor bars 26 as well as opposite shorting end rings 27 can be cast directly in place relative to the spiral stacking of the continuous metal strip. Balancing grooves 28 can be formed with these end turns 27 and axially projecting radial fan blades 29 can also be cast integral with at least one of the end rings 27.

In the embodiment of either component having a slotted portion including slots such as 12s or 15s it would also be possible to cast metal as winding means into these slots. Then it is possible to have a continuous support or annular member that closes off the slot gaps as mentioned earlier so as to keep molten material such as aluminum from leaking out of a predetermined mold shape. The mold shape can form the cast winding means including suitable end turns or end rings therefor.

A dynamoelectric machine having structure in accordance with the present invention could be used as a generator on motor vehicles. In such an embodiment the portions such as 14 and 15 would form a rotor and the radially outer portions 11 and 12 would provide a stator having suitable windings fitted into slots 12s thereof. Each of the portions such as 11, 12, 14 and 15 can have spiralled strip material formed into an "anguilloid" configuration to provide structural components in accordance with the present invention. It should also be noted that the dynamoelectric machine in accordance with the present invention can be used on appliances such as on a furnace heater or blower motor.

In FIGURE 10 there is a metal strip means generally indicated by numeral 30 including opposite complementary first and second continuous edging portions 31 and 32. Each of the edging portions 31 and 32 has a plurality of notches or notching N only along one side or edge thereof subject to subsequent engagement of keying K provided on an outer periphery of an arbor A as indicated in FIGURE 10. This arbor A can be seen in greater detail in views of FIGURES 6 and 7.

The strip means 30 of FIGURE 10 further includes transverse cutting or pairs of transverse slots 34 located mainly on opposite sides of an intermediate tooth or pole segment 35 as well as end teech or pole segments 36 and 37 as illustrated in views of FIGURES 10 and 11. Only very short notch-like endings 34e complementary to the cutouts or slots 34 remain in the opposite edging portions 31 and 32 and these are in alternate positioning as to the notches N. The strip means 30 can be progressively stamped by a suitable die structure and arrangement such that the opposite outer peripheral edges having the notches N therein require no subsequent machining or grinding operation. Similarly a die cutting operation can occur to form a truncated-cone-like opposite pole or collective tooth formation including provision of angularly or slanted cuts 38 and 39. A slightly curved or semi-arcuate cut 40 is made for each intermediate tooth segment 35 adjacent to opposite edging portions 31 and 32. Further arcuate cuts 41 and 42 are made for the tooth segments 37 and 36 respectively for each of the opposite complementary portions integral with the edging portions 31 and 32. These curved or arcuate cuts 40, 41 and 42 are shown enlarged in a view of FIGURE 11. The cuts collectively become an annular outer periphery of circular configuration without requiring further machining, grinding or cutting as a result of bending of the strip portions around arbor means as shown in a right hand portion of FIGURE 10 of the drawings. Once the continuous spiral lamination assembly is formed on such arbor means, the segments 35–36–37 collectively can form electrical poles subject to fitting of winding means W into openings or expanded slot locations therebetween as indicated in FIGURE 10. The notching N as well as the slot ends 34e as well as the cutting or slots 34 facilitate bending into a continuous spiral and arcuate configuration.

Figure 12:
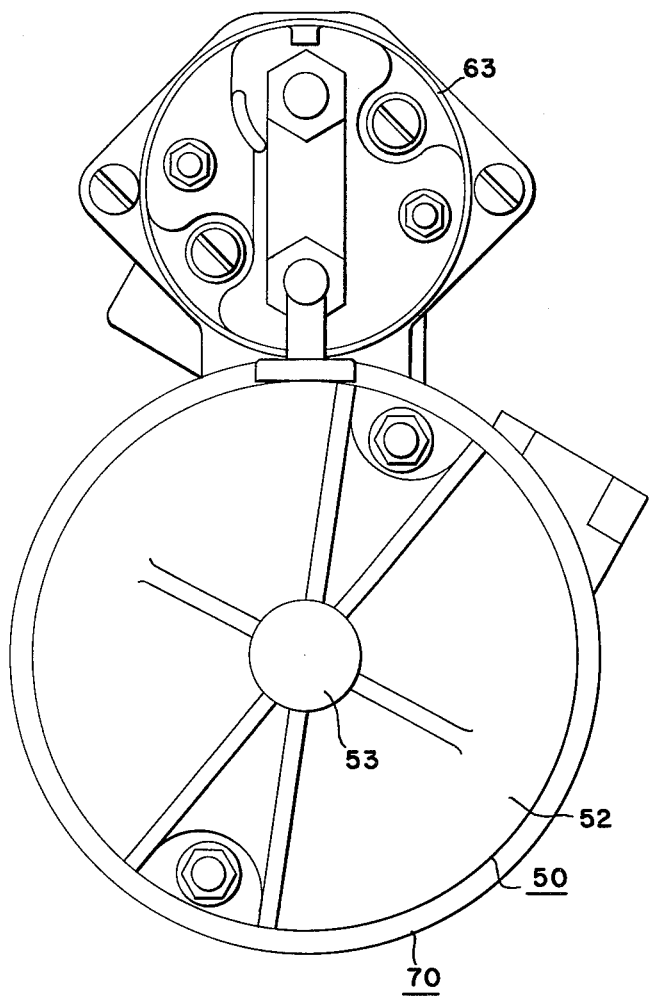
FIGURE 12 is an end view of a dynamoelectric machine or cranking-starter motor having spiral strip and stator housing portions arranged with features in accordance with the present invention.
Figure 13:
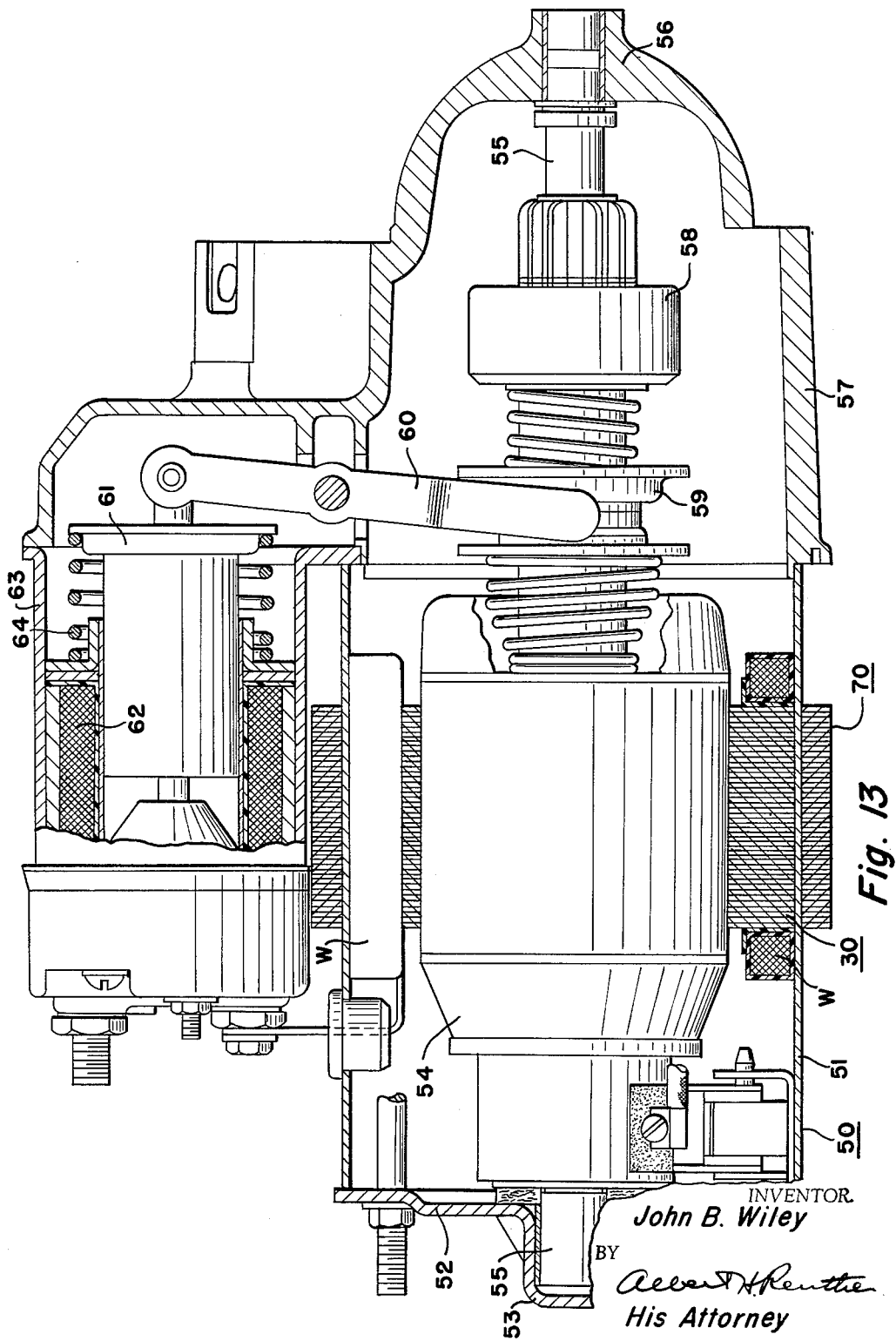
FIGURE 13 is a sectioned elevational view of the machine of FIGURE 12.

It is to be understood that such curved or semi-arcuate edging as identified by reference numerals 40–41–42 can be provided also for ends 12x of spiral strip material teeth illustrated in FIGURE 4 as well as in FIGURE 1 of the drawings. Also, the strip means of FIGURES 10 and 11 can be used for dynamoelectric machine structure illustrated in FIGURE 1 of the drawings. The advantage of the strip means of FIGURES 10 and 11 is that machining is eliminated by stamping or die forming the strip means to have curvature or radii along the top edging of the teeth. The spiral strip means illustrated in FIGURES 10 and 11 can be used in a dynamoelectric machine or cranking-starter motor illustrated in views of FIGURES 12 and 13 of the drawings. Such a dynamoelectric machine or cranking-starter motor is generally indicated by numeral 50 in FIGURES 12 and 13 having a thin metal or "tin-can" body portion 51 visible in FIGURE 13. An end portion 52 sealingly engages one end of the body portion 51 and includes a central hub or shaft journaling portion 53. An armature assembly 54 carried on a shaft 55 as shown in FIGURE 13 can be journaled at one end on this hub portion 53 and at an opposite end can be journaled in a bearing portion 56 of a motor or starter drive housing end means 57. The shaft 55 can carry a drive clutch means 58 as well as suitable spring means on opposite sides of a shiftable member or pulley 59. This shiftable member or pulley 59 is engaged by a centrally pivoted lever 60 journaled at one end to a plunger assembly 61. The plunger assembly 61 is axially reciprocable in a bore or central passage of a solenoid means 62 retained in a housing or auxiliary mounting portion 63. A return spring 64 can be provided to bias the shift lever 60 and plunger assembly 61 in a well known manner. Previously a large and thick main frame was required and used whereas now a relatively thin sheet metal or "tin-can" body portion 51 is mounted to be sealingly engaged against the housing end means 57 at one end and the end portion 52 at an opposite end. In accordance with the present invention, a stator winding means W is fitted to slots of spiral strip means generally indicated by numeral 30 in FIGURE 13. This illustrates provision of one of complementary portions formed from such strip means into an arcuate and continuous spiral configuration by use of an arbor A as indicated in FIGURE 10. This spiral strip means having notching as well as the pole-forming tooth portions 40, 41 and 42 can be press-fitted and secured directly to an inner periphery of the thin sheet metal or "tin-can" body portion 51 in a location radially outwardly from the rotor means or armature assembly 54. Located radially outwardly from the spiral strip means 30 and along an outer periphery of the body portion 51 there is a solid continuous spiral yoke means generally indicated by numeral 70. This yoke means 70 is also edge wound as shown in FIGURE 2 of the drawings. However now the yoke means is located radially outside the body portion 51 which is tightly and snugly held radially in an intermediate location between the yoke means and the spiral strip means 30. The notches N are provided on the spiral strip means 30 as the wound stator component requiring no machining and also having no large and thick frame or body portion required. Testing of a cranking-motor or dynamoelectric machine as shown in FIGURES 12 and 13 was conducted before and after such notches were machined into pole shoe structure. Notches in the pole shoes were not harmful to motor performance and the motor even tested more favorably after the notches were made. The notches along an edge of the strip means are made to be substantially the same width as a slot would be. As a result there is in effect a full tooth face without a short circuiting ring of metal completely continuous all the way around. Due to distance between the notches, there is a split flux pattern electrically possibly partially effected by having a slot present and the main purpose of the notches is to permit keying or tooth-like sprocket projections to mate exactly therewith and to permit stretching or elongating of metal to correct annular distance at each and every keying location as to the notches. Thus a proper alignement is accurately achieved in accordance with the sprocket or arbor keying due to friction or traction engagement therebetween.

Provision of the yoke means 70 externally without machining is advantageous since the stator core can be supplemented or augmented with an anguloid or spiral strip means both radially outwardly and radially inwardly on opposite sides of the thin sheet metal or "tin-can" body portion 51. A greatly reduced cost is realized due to savings in machining operations, capital expenditure for expensive machining equipment as well as for frame materials per se. Such savings in material can be of particular value for mass production operations such as manufacture of an alternator or generator assembly.

Figure 14:
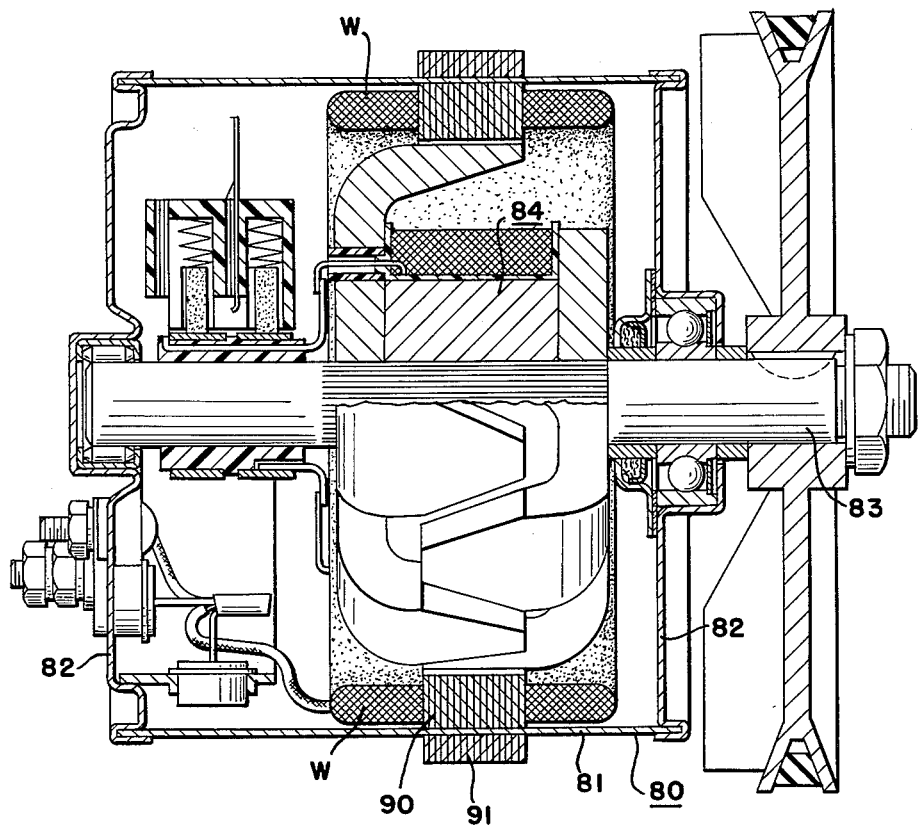
FIGURE 14 is a sectional elevational view of another dynamoelectric machine or alternator-generator assembly incorporating features similar to those of FIGURES 12 and 13 and utilizing spiral strip and housing portion arrangement in accordance with the present invention.

FIGURE 14 illustrates features of the present invention provided on an alternator or generator assembly generally indicated by numeral 80 having a thin metal or "tin-can" body portion 81 as well as opposite end or lid portions 82. Suitable bearing means can be provided with these end portions for journaling of a shaft 83 carrying an armature or rotor assembly generally indicated by numeral 84. Details of the specific armature assembly can be in accordance with a disclosure of a copending U.S. patent application Serial Number 129,006, Brown et al., filed August 3, 1961, and belonging to the assignee of the present invention. Reference can also be made to a Patent 3,078,409, Bertsche et al. issued February 19, 1963, as to operational features of a similar alternator or generator assembly. Both this application and patent belong to the assignee of the present invention. As to the housing means per se including the body portion 81 and end portion 82 reference can be made to a Patent 3,081,411, Wiley issued March 12, 1963, and belonging to the assignee of the present invention. However, in each of the application and patent disclosures noted the stator assembly is entirely inside the frame or body portion whereas in accordance with the present invention the body portion such as 51 and 81 is located intermediate an external yoke means 70 indicated in FIGURE 13 and similar spiral yoke means 90 indicated in FIGURE 14. In FIGURE 14 also, winding means W can be fitted to a slotted spiral lamination structure 91 similar to that illustrated either in FIGURE 4 or FIGURES 10 and 11 of the drawings. However, the structure of FIGURE 14 is preferably fitted with a multi-slotted spiral lamination structure as illustrated in FIGURE 4 subject to use of notching as described previously. Savings realized from elimination of turning and machining as well as reduction of frame material make spiralling or edge-winding considerably more attractive for production purposes as facilitated by the notching.

While the embodiments of the present invention herein disclosed constitute preferred forms, it is to be understood that other forms might be adopted.

What is claimed is as follows:

1. A procedure for making a wound laminated structure for use as a dynamoelectric machine stator and rotor magnetic core assembly, comprising, notching a teeth-containing flat longitudinal metal strip along the edging opposite to that of said teeth and in alignment with the longitudinal axis of each of said teeth to thereby define winding slots on said strip, said notching occurring at evenly spaced intervals along the said opposite edging; and edge winding the notched strip on an annular splined keying arbor with said notches cooperating with said splined and keying arbor to hinge the strip at the said notches and simultaneously form metal segments between the notches to conform substantially to the annular arbor surface.

2. The procedure of claim 2 wherein at predetermined locations between said teeth there is rivet aperturing defined collectively in accurate alignment intermediate said notching.

3. The procedure of claim 1 wherein said notching remains in alignment with the longitudinal axis of each of said teeth though said teeth at locations remote from said notching are spread apart into defining larger slot area between adjacent teeth as facilitated by said notching during said edge winding step.

4. The procedure of claim 1 wherein during said edge winding to conform substantially to the annular arbor surface there is simultaneously elongating in the segments of the metal strip at every location of said notching for progressive aligning of the teeth-containing metal strip during annular formation on the arbor surface facilitated by said notching.

References Cited by the Examiner

UNITED STATES PATENTS

| | | | |
|---|---|---|---|
| 356,902 | 2/1887 | Thomson | 29—155.57 X |
| 1,784,649 | 12/1930 | Wood | 29—155.61 X |
| 1,920,154 | 7/1933 | Carlson | 153—64.5 X |
| 1,920,155 | 7/1933 | Fisher | 153—64.5 X |
| 2,247,890 | 7/1941 | Reardon | 310—42 X |
| 2,360,303 | 10/1944 | Ingalls | 310—40 |
| 2,402,214 | 6/1946 | Suydam | 310—40 |
| 2,630,463 | 3/1953 | Smith | 310—262 X |
| 2,643,863 | 6/1953 | Buschow | 29—157.3 X |
| 2,716,247 | 8/1955 | Poupitch | 153—64.5 X |
| 2,902,666 | 9/1959 | Novajovsky | 29—155.55 X |
| 3,002,263 | 10/1961 | Feinberg et al. | 29—155.61 |
| 3,081,411 | 3/1963 | Wiley | 310—42 X |
| 3,096,568 | 7/1963 | Biggs et al. | 29—155.61 |
| 3,193,713 | 7/1965 | Larson et al. | 310—42 X |

FOREIGN PATENTS

| | | |
|---|---|---|
| 793,545 | 4/1958 | Great Britain. |

WHITMORE A. WILTZ, *Primary Examiner.*

MILTON O. HIRSHFIELD, R. W. CHURCH, J. J. SWARTZ, *Assistant Examiners.*